United States Patent
Liao et al.

(10) Patent No.: US 11,643,564 B2
(45) Date of Patent: May 9, 2023

(54) WATER-BASED PRINTING INK COMPOSITION FOR GRAVURE PRINTING AND METHOD FOR PRODUCING THE SAME

(71) Applicant: NAN YA PLASTICS CORPORATION, Taipei (TW)

(72) Inventors: Te-Chao Liao, Taipei (TW); Chun-Che Tsao, Taipei (TW); Jhen-Rong Syu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 416 days.

(21) Appl. No.: 16/891,310

(22) Filed: Jun. 3, 2020

(65) Prior Publication Data

US 2021/0087414 A1    Mar. 25, 2021

(30) Foreign Application Priority Data

Sep. 25, 2019  (TW) ................................ 108134525

(51) Int. Cl.
  *C09D 11/102*  (2014.01)
  *C09D 11/037*  (2014.01)
(52) U.S. Cl.
  CPC .......... *C09D 11/102* (2013.01); *C09D 11/037* (2013.01)
(58) Field of Classification Search
  None
  See application file for complete search history.

(56) References Cited

U.S. PATENT DOCUMENTS 6,287,374 B1 * 9/2001 Yanagida ............. C09D 11/324
                                                                106/478
10,611,928 B2  4/2020 Lin et al.

FOREIGN PATENT DOCUMENTS

| CN | 101020797 A | 8/2007 |
| CN | 101029194 A | 9/2007 |
| CN | 102757694 A | 10/2012 |
| CN | 103194121 A | 7/2013 |
| CN | 103709824 A | * 4/2014 |
| CN | 103709824 A | 4/2014 |
| CN | 108026421 A | 5/2018 |
| CN | 108117797 A | 6/2018 |

OTHER PUBLICATIONS

Jiang Gu, Zhu Yu Chuan; "Soft packaging printing and post processing techno"; Editorial Department of Printing Industry Publishing House; Sep. 30, 2007; p. 74.

* cited by examiner

*Primary Examiner* — Joshua D Zimmerman
(74) *Attorney, Agent, or Firm* — Li & Cai Intellectual Property (USA) Office

(57) ABSTRACT

A water-based printing ink composition for gravure printing and a method for producing the same are provided. The water-based printing ink composition includes: 1 to 15 parts by weight of a pigment, 1 to 50 parts by weight of an aqueous resin mixture, 1 to 20 parts by weight of a quick-drying agent, and 30 to 80 parts by weight of water. The aqueous resin mixture includes a first aqueous resin and a second aqueous resin, a first glass transition temperature of the first aqueous resin is greater than a second glass transition temperature of the second aqueous resin, and an absolute value of the difference between the first glass transition temperature and the second glass transition temperature is not less than 40° C. The quick-drying agent is an alcohol or a ketone, and the quick-drying agent has a boiling point of not greater than 85° C.

14 Claims, No Drawings

WATER-BASED PRINTING INK COMPOSITION FOR GRAVURE PRINTING AND METHOD FOR PRODUCING THE SAME

CROSS-REFERENCE TO RELATED PATENT APPLICATION

This application claims the benefit of priority to Taiwan Patent Application No. 108134525, filed on Sep. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a printing ink composition, and more particularly to a water-based printing ink composition suitable for gravure printing and a method for producing the same.

BACKGROUND OF THE DISCLOSURE

In the current gravure printing industry, with consideration to printing speed, most gravure printing uses oil-based printing ink. The solvent of the oil-based printing ink is mainly toxic volatile organic solvents such as toluene or methyl ethyl ketone. Therefore, the oil-based printing ink is highly harmful to the environment. Furthermore, since the use of oil-based printing ink requires the construction of organic solvent recovery equipment, the cost of construction and maintenance of printing equipment will be quite high.

SUMMARY OF THE DISCLOSURE

In response to the above-referenced technical inadequacies, the present disclosure provides a water-based printing ink composition suitable for gravure printing and a method for producing the same.

In one aspect, the present disclosure provides a water-based printing ink composition suitable for gravure printing. The water-based printing ink composition includes following components, and the total weight of the following components is 100 parts by weight: component (1), being 1 part by weight to 15 parts by weight of a pigment; component (2), being 1 part by weight to 50 parts by weight of an aqueous resin mixture; component (3), being 1 part by weight to 20 parts by weight of a quick-drying agent; and component (4), being 30 parts by weight to 80 parts by weight of water. The aqueous resin mixture of the component (2) includes: (a) a first aqueous resin having a first glass transition temperature; and (b) a second aqueous resin having a second glass transition temperature. The first glass transition temperature is greater than the second glass transition temperature, and an absolute value of a difference between the first glass transition temperature and the second glass transition temperature is not less than 40° C. The quick-drying agent of component (3) is at least one material selected from the group consisting of an alcohol and a ketone, and the quick-drying agent has a boiling point of not greater than 85° C.

In another aspect, the present disclosure provides a method for producing a water-based printing ink composition suitable for gravure printing, including: mixing 1 part by weight to 15 parts by weight of a pigment, 1 part by weight to 50 parts by weight of an aqueous resin mixture, and 30 parts by weight to 80 parts by weight of water to form a water-based mixture; pouring 1 part by weight to 20 parts by weight of a quick-drying agent into the water-based mixture to form the water-based printing ink composition; wherein the total weight of the water-based printing ink composition is 100 parts by weight. The aqueous resin mixture includes a first aqueous resin and a second aqueous resin. The first aqueous resin has a first glass transition temperature, the second aqueous resin has a second glass transition temperature, the first glass transition temperature is greater than the second glass transition temperature, and an absolute value of a difference between the first glass transition temperature and the second glass transition temperature is not less than 40° C. The quick-drying agent is at least one material selected from the group consisting of an alcohol and a ketone, and the quick-drying agent has a boiling point of not greater than 85° C.

Therefore, the water-based printing ink composition of the present disclosure can have a fast drying rate, good storage stability, and good printability by virtue of "the material selections (i.e., the material selections of aqueous resin mixture and quick-drying agent) and the content range of each component", "the first glass transition temperature being greater than the second glass transition temperature, and an absolute value of a difference between the first glass transition temperature and the second glass transition temperature being not less than 40° C." and "the quick-drying agent being at least one material selected from the group consisting of an alcohol and a ketone, and the quick-drying agent having a boiling point of not greater than 85° C.". Moreover, the coating film formed by the water-based printing ink composition can have good low temperature adhesion performance and good scratch resistance. Therefore, the water-based printing ink composition of the present disclosure is particularly suitable for gravure printing.

In addition, since the main solvent of the water-based printing ink composition of the present disclosure is water, the printing ink composition is less harmful to the environment, and the use of the printing ink composition does not require any organic solvent recovery equipment. Moreover, the installation and maintenance costs of printing equipment can also be effectively reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Water-Based Printing Ink Composition

An embodiment of the present disclosure discloses a water-based printing ink composition, and more particularly to a water-based printing ink composition suitable for gravure printing. The water-based printing ink composition can be applied to a substrate, such as paper, through a gravure printing process, and the water-based printing ink composition can be formed into a coating film (also called an aqueous coating film) on the substrate after drying.

Further, the water-based printing ink composition has a low film-forming temperature and a faster drying speed by virtue of the material selections (i.e., the material selections of aqueous resin mixture and quick-drying agent) and the content range of each component. In addition, the water-based printing ink composition has good storage stability at room temperature, and the surface of a coating film that is formed by the water-based printing ink composition after printing has good surface physical properties, such as adhesion ability and scratch resistance.

In the present embodiment, the water-based printing ink composition includes a pigment, an aqueous resin mixture, a quick-drying agent, water, and other trace additives, such as a defoaming agent, a film-forming agent, and a wetting agent.

The pigment may be, for example, an organic pigment or an inorganic pigment. In addition, when the pigment is used, the pigment can cover a primary color of the substrate. In order to meet the requirements of various colors, one or a mixture of two or more pigments may be used. The inorganic pigment may be, for example, at least one of a titanium dioxide pigment, a chromium pigment, an iron oxide pigment, a black titanium, and a carbon black. The organic pigment may be, for example, at least one of an azo pigment and a cyanine pigment, but the present disclosure is not limited thereto.

In terms of the amount of the pigment, based on the total weight of the water-based printing ink composition being 100 parts by weight, the amount of the pigment generally ranges from 1 to 15 parts by weight, preferably ranges from 3 to 15 parts by weight, and more preferably ranges from 5 to 10 parts by weight.

If the amount of the pigment is lower than the lower limit of the above-mentioned amount range (i.e., lower than 1 part by weight), the color of the water-based printing ink composition will be too light to be suitable for gravure printing. When the water-based printing ink composition is printed on a substrate and formed into a coating film, if the amount of the pigment is higher than the upper limit of the above-mentioned amount range (i.e., higher than 15 parts by weight), the adhesion between the coating film and the substrate will be poor, and the scratch resistance of the coating film will be poor.

Further, in the present embodiment, the aqueous resin mixture includes a first aqueous resin and a second aqueous resin. It should be noted that the aqueous resin mixture of the present embodiment is described as the aqueous resin mixture having two different aqueous resins, but the present disclosure is not limited thereto. For example, the aqueous resin mixture may also have at least three different aqueous resins according to the requirements of product design.

In terms of the amount of the aqueous resin mixture, based on the total weight of the water-based printing ink composition being 100 parts by weight, the amount of the aqueous resin mixture generally ranges from 1 to 50 parts by weight, preferably ranges from 10 to 40 parts by weight, and more preferably ranges from 15 to 25 parts by weight.

When the water-based printing ink composition is printed on a substrate and formed into a coating film, if the amount of the aqueous resin mixture is lower than the lower limit of the above-mentioned amount range (i.e., lower than 1 part by weight), the coating film will be too loose, so that the adhesion between the coating film and the substrate will be poor. If the amount of the aqueous resin mixture is higher than the upper limit of the above-mentioned amount range (i.e., higher than 50 parts by weight), the viscosity of the water-based printing ink composition will be too high, so that the printability of the water-based printing ink composition will be poor.

Further, in the aqueous resin mixture, the first aqueous resin is at least one material selected from the group consisting of aqueous acrylic resin, aqueous polyurethane resin, copolymer resin of aqueous acrylic and aqueous polyurethane, aqueous polyester resin, aqueous epoxy resin, and aqueous alkyd resin. In addition, the second aqueous resin is at least one material selected from the group consisting of aqueous acrylic resin, aqueous polyurethane resin, copolymer resin of aqueous acrylic and aqueous polyurethane, aqueous polyester resin, aqueous epoxy resin, and aqueous alkyd resin. It is worth mentioning that the aqueous resins exemplified above are respectively one of water-dispersible resins or emulsion-type resins, but the present disclosure is not limited thereto.

The main difference between the first aqueous resin and the second aqueous resin is that the two aqueous resins have different physico-chemical properties. More specifically, the first aqueous resin has good scratch resistance, and the second aqueous resin has good low temperature adhesion performance.

In order to achieve the above object, in the present embodiment, the first aqueous resin has a first glass transition temperature, and the second aqueous resin has a second glass transition temperature. Further, the first glass transition temperature is greater than the second glass transition temperature, and an absolute value of a difference between the first glass transition temperature and the second glass transition temperature is not less than 40° C.

More specifically, in an embodiment of the present disclosure, the first glass transition temperature of the first aqueous resin is preferably not less than 100° C., and the second glass transition temperature of the second aqueous resin is preferably not greater than 60° C. Therefore, the first aqueous resin can have good scratch resistance, and the second aqueous resin can have good low temperature adhesion performance.

The first aqueous resin having the glass transition temperature of not less than 100° C. is preferably at least one material selected from the group consisting of aqueous polyurethane resin, aqueous acrylic resin, aqueous polyvinyl chloride resin and the like. Furthermore, the second aqueous resin having the glass transition temperature of not greater than 60° C. is preferably at least one material selected from the group consisting of aqueous polyurethane resin, aqueous acrylic resin, aqueous polyvinyl chloride resin and the like, but the present disclosure is not limited thereto.

In order to enable the physico-chemical properties of the above two aqueous resins to complement each other, in an embodiment of the present disclosure, the first aqueous resin and the second aqueous resin are preferably mixed with each other by blending. Furthermore, in order to enable the physico-chemical properties of the above two aqueous resins to be fully exhibited in the water-based printing ink composition, the first aqueous resin and the second aqueous resin have a preferred weight ratio range. More specifically, a weight ratio of the first aqueous resin to the second aqueous resin is preferably in the range of 1:5 to 5:1, and more preferably in the range of 1:3 to 3:1. If the weight ratio of the first aqueous resin to the second aqueous resin is not within the above range, the physico-chemical properties of at least one of the aqueous resins will not be fully exhibited in the water-based printing ink composition.

According to the above configuration, the water-based printing ink composition of the present embodiment has two different aqueous resins that are blended with each other according to a specific weight ratio range. Accordingly, the coating film formed by the water-based printing ink composition can have good scratch resistance and good low temperature adhesion performance.

Further, in the present embodiment, the purpose of using the quick-drying agent is to reduce the heat of vaporization required during the film formation of the water-based printing ink composition, to reduce the minimum film-forming temperature (MFFT) of the coating film, and to increase the drying speed of the coating film, so that the water-based printing ink composition can be applied to gravure printing.

In order to achieve the above object, in the present embodiment, the quick-drying agent is preferably at least one material selected from the group consisting of an alcohol and a ketone that are miscible with water, and the quick-drying agent has a boiling point of not greater than 85° C. Furthermore, based on the evaporation rate of butyl acetate being 100, the quick-drying agent has a relative evaporation rate of not less than 200.

More specifically, the alcohol is methanol, ethanol, or isopropanol. Among them, the boiling point of methanol is 64.7° C., the boiling point of ethanol is 78.37° C., and the boiling point of isopropyl alcohol is 82.5° C. That is, the boiling points of the above quick-drying agents are all not greater than 85° C. Furthermore, based on the evaporation rate of butyl acetate being 100, the relative evaporation rate of methanol is 370, the relative evaporation rate of ethanol is 203, and the relative evaporation rate of isopropyl alcohol is 205. That is, based on the evaporation rate of butyl acetate being 100, the relative evaporation rates of the above quick-drying agents are all not less than 200.

In terms of the amount of the quick-drying agent, based on the total weight of the water-based printing ink composition being 100 parts by weight, the amount of the quick-drying agent generally ranges from 1 to 20 parts by weight, preferably ranges from 3 to 15 parts by weight, and more preferably ranges from 5 to 10 parts by weight.

When the water-based printing ink composition is printed on a substrate and formed into a coating film, if the amount of the quick-drying agent is lower than the lower limit of the above-mentioned amount range (i.e., lower than 1 part by weight), the drying speed of the coating film will be too slow, so that the water-based printing ink composition is not suitable for gravure printing. If the amount of the quick-drying agent is higher than the upper limit of the above-mentioned amount range (i.e., higher than 20 parts by weight), the storage stability of the water-based printing ink composition will be decreased. For example, when the water-based printing ink composition is placed for a period of time, the phenomenon of solid agglomeration or precipitation of the composition may occur.

According to the above configuration, the minimum film-forming temperature (MFFT) of the water-based printing ink composition can be effectively reduced, and the drying speed of the coating film can be effectively increased by virtue of the material selection of the quick-drying agent and the content range of the quick-drying agent.

Further, in the present embodiment, the purpose of using water is as a solvent for the pigment and the aqueous resin mixture. That is, in the water-based printing ink composition, the pigment and the aqueous resin mixture are uniformly dispersed in the solvent water. Among them, the water in the present embodiment may be, for example, distilled water or deionized water, but the present disclosure is not limited thereto.

In terms of the amount of water, based on the total weight of the water-based printing ink composition being 100 parts by weight, the amount of water generally ranges from 30 to 80 parts by weight, preferably ranges from 55 to 75 parts by weight, and more preferably ranges from 60 to 70 parts by weight.

If the amount of water is lower than the lower limit of the above-mentioned amount range (i.e., lower than 30 parts by weight), the pigment and the aqueous resin mixture cannot be uniformly dispersed in the solvent water, and the viscosity of the water-based printing ink composition will be too high, so that the printability of the water-based printing ink composition will be poor. If the amount of water is higher than the upper limit of the above-mentioned amount range (i.e., higher than 80 parts by weight), the content of water is too high, and the content of quick-drying agent is too low, so that the drying speed of the coating film will become too slow.

It is worth mentioning that since the main solvent of the water-based printing ink composition of the present embodiment is water, the printing ink composition is less harmful to the environment, and the use of the printing ink composition does not require any organic solvent recovery equipment. Moreover, the installation and maintenance costs of printing equipment can also be effectively reduced.

In addition, by virtue of the material selections (i.e., the material selections of aqueous resin mixture and quick-drying agent) and the content range of each component, the drying speed of the water-based printing ink composition of the present embodiment is comparable to the existing oil-based printing ink, thereby achieving a high printing speed.

Further, in the present embodiment, in order to increase the performance of the water-based printing ink composition, the water-based printing ink composition may be added with other trace additives, such as a defoaming agent, a film-forming agent, and a wetting agent. The other trace additives described above are not the essential features of the present disclosure, and will not be described in detail herein.

In terms of the amount of the trace additives, based on the total weight of the water-based printing ink composition being 100 parts by weight, the total amount of the trace additives preferably ranges from 0.1 to 5 parts by weight, but the present disclosure is not limited thereto.

According to the above material selections and the content of each component, the water-based printing ink composition of the present embodiment has a viscosity between 50 centipoise (cP) and 300 centipoise (cP). In addition, the water-based printing ink composition of the present embodiment has a minimum film-forming temperature (MFFT) between 30° C. and 60° C., and has a film-forming thickness between 1 μm and 10 μm. Accordingly, the water-based printing ink composition of the present embodiment has good printability and is particularly suitable for gravure printing.

In addition, after the water-based printing ink composition of the present embodiment is printed, greater than 95% of the water content of the printing ink composition can be removed under a drying temperature between 45° C. and 55° C. and a drying time of not greater than 60 seconds, so that a coating film is formed. Moreover, in the coating film, a content of the quick-drying agent is not greater than 20 parts per million by weight (ppm), preferably not greater than 10 parts per million by weight, and more preferably not greater than 3 parts per million by weight. Therefore, the coating film formed by the water-based printing ink composition of the present embodiment has low environmental hazard, and thus has high application value.

Furthermore, within half a year of being stored at room temperature, the phenomenon of solid agglomeration or precipitation of the composition may not occur in the water-based printing ink composition. In other words, the water-based printing ink composition of the present embodiment has good storage stability.

Finally, when the coating film formed by the water-based printing ink composition of the present embodiment is rubbed with a dry cloth for 200 times, the coating film will not be peeled off. That is, the coating film formed by the water-based printing ink composition of the present embodiment has good scratch resistance.

Method for Producing Water-Based Printing Ink Composition

The above is the relevant description of the water-based printing ink composition of the present embodiment, and the following will describe the method for producing the water-based printing ink composition according to the embodiment of the present disclosure.

The embodiment of the present disclosure also discloses a method for producing a water-based printing ink composition. The method for producing the water-based printing ink composition includes step S110, step S120, and step S130. It should be noted that the order of the steps and the actual way of operation recited in the present embodiment can be adjusted according to requirements, and is not limited to those recited in the present embodiment.

The step S110 includes: pouring and mixing 1 to 15 parts by weight of a pigment, 1 to 50 parts by weight of an aqueous resin mixture, and 30 to 80 parts by weight of water into a mixing tank to form a water-based mixture.

The step S120 includes: slowly pouring 1 to 20 parts by weight of a quick-drying agent into the mixing tank, and mixing the quick-drying agent with the water-based mixture.

The step 130 includes: slowly pouring 0.1 to 5 parts by weight of other trace additives (i.e., a defoaming agent, a film-forming agent, and a wetting agent) into the mixing tank, and mixing the trace additives with the water-based mixture to form the water-based printing ink composition.

It should be noted that the total weight of the water-based printing ink composition is 100 parts by weight. In addition, the aqueous resin mixture includes a first aqueous resin and a second aqueous resin. The first aqueous resin has a first glass transition temperature, the second aqueous resin has a second glass transition temperature, the first glass transition temperature is greater than the second glass transition temperature, and an absolute value of a difference between the first glass transition temperature and the second glass transition temperature is not less than 40° C. The quick-drying agent is at least one material selected from the group consisting of an alcohol and a ketone, and the quick-drying agent has a boiling point of not greater than 85° C.

The water-based printing ink composition has a minimum film-forming temperature (MFFT) between 30° C. and 60° C., and has a film-forming thickness between 1 μm and 10 μm. After the water-based printing ink composition is printed, greater than 95% of the water content of the printing ink composition is removed under a drying temperature between 45° C. and 55° C. and a drying time of not greater than 60 seconds, so that a coating film is formed. In the coating film, a content of the quick-drying agent is not greater than 20 parts per million by weight (ppm), preferably not greater than 10 parts per million by weight, and more preferably not greater than 3 parts per million by weight.

Experimental Test

Hereinafter, the content of the present disclosure will be described in detail with reference to exemplary examples 1 to 3 and comparative examples 1 to 5. However, the following examples are only to help in understanding the present disclosure, and the present disclosure is not limited to these examples.

Exemplary example 1: 5 grams of a pigment (i.e., Novoperm Yellow HR 70 purchased from clariant), 5 grams of a first aqueous resin (i.e., aqueous polyurethane resin modified by polycarbonate), 13 grams of a second aqueous resin (i.e., aqueous polyurethane resin modified by polyester), and 70 grams of water are poured into a mixing tank to form a water-based mixture. Next, 5 grams of a quick-drying agent (i.e., ethanol) is slowly poured into the mixing tank, and is mixed with the water-based mixture. Finally, 2 grams of other trace additives (i.e., a defoaming agent, a film-forming agent, and a wetting agent) are slowly poured into the mixing tank, and are mixed with the water-based mixture to form a water-based printing ink composition. The glass transition temperature of the first aqueous resin is not less than 100° C., and the glass transition temperature of the second aqueous resin is not greater than 60° C.

The methods for producing the water-based printing ink compositions of the exemplary examples 2 to 3 and the comparative examples 1 to 5 are almost the same as those of the exemplary example 1. The difference is that the amounts of the components in the exemplary examples 2 to 3 and the comparative examples 1 to 5 are different from those of the exemplary example 1. The amounts of the components are summarized in Table 1 below.

The physico-chemical properties of the water-based printing ink compositions prepared in the exemplary examples 1 to 3 and the comparative examples 1 to 5 were tested to obtain the minimum film-forming temperature (MFFT), film-forming thickness, drying rate, storage stability, adhesion ability, scratch resistance, and printability. The relevant test methods are described below, and the relevant test results are summarized in Table 1 below.

The test of minimum film-forming temperature (MFFT) includes: coating the water-based printing ink composition on a substrate; and observing the minimum temperature at which the water-based printing ink composition can form a continuous coating film on the substrate. This temperature is defined as the minimum film-forming temperature (MFFT). In general, the minimum film-forming temperature can be tested according to ISO 2115.

The test of film-forming thickness includes: after the water-based printing ink composition is applied to the substrate and formed into the continuous coating film, the thickness of the coating film can be measured using a film thickness meter.

The test of drying rate includes: coating the water-based printing ink composition on the substrate (about 1 micrometer of film thickness); placing the water-based printing ink composition and the substrate at an ambient temperature of 50° C.; and observing the time required for the removal of most of the water content of the water-based printing ink composition (i.e., more than 95% of water); and recording this time as the drying rate.

The test of storage stability includes: placing the water-based printing ink composition at room temperature; and observing the time required for the solid precipitation or agglomeration of the composition.

The test of adhesion includes: using the hundred grid test (also called the knife test) to test the adhesion between the coating film and the substrate according to ASTM D6677. The hundred grid test is to use a hundred grid knife to draw 10×10 small grids of 1 mm×1 mm on the coating film of the test sample, in which each line should be cut deep to the bottom of the coating film; then use a brush to clean the debris from the test area of the test sample; then use 3M Scotch® adhesive tape to firmly adhere to the small grids to be tested, and wipe the adhesive tape with an eraser to increase the contact area and adhesive strength of the tape and the test area; then grab one end of the tape, quickly pull off the adhesive tape along the vertical direction, and perform the same test twice at the same location; then observe whether the coating film has peeled off from the substrate and record the test result.

The test of scratch resistance includes: rubbing the coating film with a dry cloth for two hundred times, and then observing whether the coating film is peeled off from the substrate, and recording the test results.

The test of printability includes: observing the appearance of the water-based printing ink composition coated on the substrate. If a continuous coating film can be formed, the printability is good. If a continuous coating film cannot be formed, the printability is poor.

Table 1 shows the amount of each component of the exemplary and comparative examples and test results.

| | items | exemplary example 1 | exemplary example 2 | exemplary example 3 | comparative example 1 |
|---|---|---|---|---|---|
| Amount of each component | pigment (g) | 5 | 10 | 9 | 30 |
| | first aqueous resin (g) | 5 | 7 | 13 | 6 |
| | second aqueous resin (g) | 13 | 8 | 7 | 12 |
| | quick-drying agent (g) | 5 | 7 | 5 | 4 |
| | water (g) | 70 | 66 | 64 | 46 |
| | other additives (g) | 2 | 2 | 2 | 2 |
| Test Results | MFFT (° C.) | 42 | 44 | 49 | 42 |
| | film-forming thickness (μm) | 1 | 1 | 1 | 1 |
| | drying rate | 50° C.-50 s | 50° C.-47 s | 50° C.-56 s | 50° C.-37 s |
| | storage stability | more than half a year | more than half a year | more than half a year | more than half a year |
| | adhesion ability | not peel off | not peel off | not peel off | peel off |
| | scratch resistance | not peel off | not peel off | not peel off | peel off |
| | printability | good | good | good | poor |

| | items | comparative example 2 | comparative example 3 | comparative example 4 | comparative example 5 |
|---|---|---|---|---|---|
| Amount of | pigment (g) | 10 | 3 | 5 | 2 |
| | first aqueous resin (g) | 20 | 0 | 7 | 5 |
| | second aqueous resin (g) | 0 | 20 | 11 | 5 |
| | quick-drying agent (g) | 4 | 7 | 30 | 6 |
| | water (g) | 59 | 68 | 45 | 80 |
| | other additives (g) | 2 | 2 | 2 | 2 |
| Test Results | MFFT (° C.) | 90 | 40 | 44 | 45 |
| | film-forming thickness (μm) | 1 | 1 | 1 | 1 |

| | | | | |
|---|---|---|---|---|
| drying rate | 50° C.-unable to form a film | 50° C.-40 s | 50° C.-20 s | 50° C.-90 s |
| storage stability | more than half a year | more than half a year | less than 10 days | more than half a year |
| adhesion ability | peel off | not peel off | not peel off | not peel off |
| scratch resistance | peel off | peel off | not peel off | not peel off |
| printability | poor | good | good | poor |

Discussion of Test Results

In the water-based printing ink compositions of the exemplary examples 1 to 3, the total amount of all the components in each exemplary example is 100 grams. The amount of the pigment in each exemplary example is between 1 and 15 grams. The total amount of the first aqueous resin and the second aqueous resin (aqueous resin mixture) in each exemplary example is between 1 and 50 grams. The amount of the quick-drying agent in each exemplary example is between 1 and 20 grams. The amount of the solvent water in each exemplary example is between 30 and 80 grams. The total amount of the other additives in each exemplary example is between 0.1 and 5 grams. According to the test results of Table 1, the water-based printing ink compositions of the exemplary examples 1 to 3 all have a minimum film-forming temperature (MFFT) between 40° C. and 50° C., a film-forming thickness of about 1 micrometer, a drying rate of not more than 60 seconds at a drying temperature of 50° C., a storage stability of more than half a year, and good printability. In addition, the coating films formed by the water-based printing ink compositions of the exemplary examples 1 to 3 all have good low temperature adhesion performance (i.e., the coating film not being peeled off after the hundred grid test), and all have good scratch resistance (i.e., the coating film not being peeled off after being rubbed with a dry cloth for 200 times). Accordingly, the water-based printing ink compositions of the exemplary examples 1 to 3 are particularly suitable for gravure printing.

In the water-based printing ink composition of the comparative example 1, the amount of the pigment is 30 grams, which is greater than 15 grams. Since the amount of the pigment is too high, the printability of the water-based printing ink composition of the comparative example 1 is poor. In addition, the coating film formed by the water-based printing ink composition of the comparative example 1 does not have good adhesion ability (i.e., the coating film being peeled off after the hundred grid test), and does not have good scratch resistance (i.e., the coating film being peeled off after being rubbed with a dry cloth for 200 times). Accordingly, the water-based printing ink composition of the comparative example 1 is not suitable for gravure printing.

The water-based printing ink composition of the comparative example 2 includes only the first aqueous resin having the glass transition temperature of not less than 100° C., and does not include the second aqueous resin having the glass transition temperature of not greater than 60° C. That is, the water-based printing ink composition of the comparative example 2 has only the characteristic of the first aqueous resin (scratch resistance), and does not have the characteristic of the second aqueous resin (low temperature adhesion performance). The minimum film-forming temperature (MFFT) of the water-based printing ink composition of the comparative example 2 is 90° C., which is much higher than 60° C. The water-based printing ink composition of the comparative example 2 has poor printability and cannot form a film at a drying temperature of 50° C. In addition, the coating film formed by the water-based printing ink composition of the comparative example 2 does not have good adhesion (i.e., after the hundred grid test, the coating film is peeled off), and does not have good scratch resistance (i.e., with a dry cloth rubbing 200 times, the coating film is peeled off). Accordingly, the water-based printing ink composition of the comparative example 2 is also not suitable for gravure printing.

The water-based printing ink composition of the comparative example 3 includes only the second aqueous resin having the glass transition temperature of not greater than 60° C., and does not include the first aqueous resin having the glass transition temperature of not less than 100° C. That is, the water-based printing ink composition of the comparative example 3 has only the characteristic of the second aqueous resin (low temperature adhesion performance), and does not have the characteristic of the first aqueous resin (scratch resistance). The printability of the water-based printing ink composition of the comparative example 3 is normal, and the coating film formed by the water-based printing ink composition of the comparative example 3 has good adhesion ability (i.e., after the hundred grid test, the coating film is not peeled off). However, the coating film formed by the water-based printing ink composition of the comparative example 3 does not have good scratch resistance (i.e., with a dry cloth rubbing 200 times, the coating film is peeled off). Accordingly, the water-based printing ink composition of the comparative example 3 is also not suitable for gravure printing.

In the water-based printing ink composition of the comparative example 4, the amount of the quick-drying agent is 30 grams, which is greater than 20 grams. Since the amount of the quick-drying agent is too high, the water-based printing ink composition of the comparative example 4 has poor storage stability. More specifically, when the water-based printing ink composition of the comparative example 4 is stored at room temperature for less than ten days, the solid precipitation or agglomeration of the composition occurs. Accordingly, the water-based printing ink composition of the comparative example 4 is also not suitable for gravure printing.

In the water-based printing ink composition of the comparative example 5, the amount of water is 80 grams, and the amount of the quick-drying agent is 6 grams. Since the amount of water is too high and the amount of the quick-drying agent is too low, the printability of the water-based printing ink composition of the comparative example 4 is not good, and the drying rate is quite slow (i.e., the formation time of the coating film requires 90 seconds at a drying temperature of 50° C.). Accordingly, the water-based printing ink composition of the comparative example 5 is also not suitable for gravure printing.

Beneficial Effects

In conclusion, the water-based printing ink composition of the present embodiment can have a fast drying rate, good storage stability, and good printability by virtue of "the material selections (i.e., the material selections of aqueous resin mixture and quick-drying agent) and the content range of each component", "the first glass transition temperature is greater than the second glass transition temperature, and an absolute value of a difference between the first glass transition temperature and the second glass transition temperature is not less than 40° C." and "the quick-drying agent is at least one material selected from the group consisting of an alcohol and a ketone, and the quick-drying agent has a boiling point of not greater than 85° C.". Moreover, the coating film formed by the water-based printing ink composition can have good low temperature adhesion performance and good scratch resistance. Therefore, the water-based printing ink composition of the present embodiment is particularly suitable for gravure printing.

In addition, since the main solvent of the water-based printing ink composition of the present embodiment is water, the printing ink composition is less harmful to the environment, and the use of the printing ink composition does not require any organic solvent recovery equipment. Moreover, the installation and maintenance costs of printing equipment can also be effectively reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit.

What is claimed is:

1. A water-based printing ink composition suitable for gravure printing, characterized in that the water-based printing ink composition comprises following components, and the total weight of the following components is 100 parts by weight:
   (1) 1 part by weight to 15 parts by weight of a pigment;
   (2) 1 part by weight to 50 parts by weight of an aqueous resin mixture;
   (3) 1 part by weight to 20 parts by weight of a quick-drying agent; and
   (4) 30 parts by weight to 80 parts by weight of water;
   wherein the aqueous resin mixture includes:
   (a) a first aqueous resin having a first glass transition temperature; and
   (b) a second aqueous resin having a second glass transition temperature;
   wherein the first aqueous resin is an aqueous polycarbonate modified polyurethane resin, and the second aqueous resin is an aqueous polyester modified polyurethane resin;
   wherein the first glass transition temperature is greater than the second glass transition temperature, and an absolute value of a difference between the first glass transition temperature and the second glass transition temperature is not less than 40° C.; wherein the first glass transition temperature is not less than 100° C., and the second glass transition temperature is not greater than 60° C.; and
   wherein the quick-drying agent is at least one material selected from the group consisting of an alcohol and a ketone, and the quick-drying agent has a boiling point of not greater than 85° C.

2. The water-based printing ink composition suitable for gravure printing according to claim 1, wherein, in the aqueous resin mixture of the component (2), the first aqueous resin and the second aqueous resin are blended with each other, and a weight ratio of the first aqueous resin to the second aqueous resin ranges from 1:5 to 5:1.

3. The water-based printing ink composition suitable for gravure printing according to claim 1, wherein in the quick-drying agent of the component (3), the alcohol is at least one of methanol, ethanol, and isopropanol.

4. The water-based printing ink composition suitable for gravure printing according to claim 1, wherein the water-based printing ink composition has a viscosity between 50 and 300 cP (centiPoise).

5. The water-based printing ink composition suitable for gravure printing according to claim 1, wherein the water-based printing ink composition has a minimum film-forming temperature (MFFT) between 30° C. and 60° C., and has a film-forming thickness between 1 μm and 10 μm.

6. The water-based printing ink composition suitable for gravure printing according to claim 2, wherein the water-based printing ink composition has a minimum film-forming temperature (MFFT) between 30° C. and 60° C., and has a film-forming thickness between 1 μm and 10 μm.

7. The water-based printing ink composition suitable for gravure printing according to claim 3, wherein the water-based printing ink composition has a minimum film-forming temperature (MFFT) between 30° C. and 60° C., and has a film-forming thickness between 1 μm and 10 μm.

8. The water-based printing ink composition suitable for gravure printing according to claim 4, wherein the water-based printing ink composition has a minimum film-forming temperature (MFFT) between 30° C. and 60° C., and has a film-forming thickness between 1 μm and 10 μm.

9. The water-based printing ink composition suitable for gravure printing according to claim 1, wherein after the water-based printing ink composition is printed, greater than 95% of the water content of the printing ink composition is removed under a drying temperature between 45° C. and 55° C. and a drying time of not greater than 60 seconds, so that a coating film is formed; wherein, in the coating film, a content of the quick-drying agent is not greater than 20 parts per million by weight (ppm).

10. The water-based printing ink composition suitable for gravure printing according to claim 2, wherein after the water-based printing ink composition is printed, greater than 95% of the water content of the printing ink composition is removed under a drying temperature between 45° C. and 55° C. and a drying time of not greater than 60 seconds, so that a coating film is formed; wherein, in the coating film, a content of the quick-drying agent is not greater than 20 parts per million by weight (ppm).

11. The water-based printing ink composition suitable for gravure printing according to claim 3, wherein after the water-based printing ink composition is printed, greater than 95% of the water content of the printing ink composition is removed under a drying temperature between 45° C. and 55° C. and a drying time of not greater than 60 seconds, so that a coating film is formed; wherein, in the coating film, a content of the quick-drying agent is not greater than 20 parts per million by weight (ppm).

12. The water-based printing ink composition suitable for gravure printing according to claim 4, wherein after the water-based printing ink composition is printed, greater than 95% of the water content of the printing ink composition is removed under a drying temperature between 45° C. and 55° C. and a drying time of not greater than 60 seconds, so that a coating film is formed; wherein, in the coating film, a content of the quick-drying agent is not greater than 20 parts per million by weight (ppm).

13. A method for producing a water-based printing ink composition suitable for gravure printing, comprising:

mixing 1 part by weight to 15 parts by weight of a pigment, 1 part by weight to 50 parts by weight of an aqueous resin mixture, and 30 parts by weight to 80 parts by weight of water to form a water-based mixture;

pouring 1 part by weight to 20 parts by weight of a quick-drying agent into the water-based mixture to form the water-based printing ink composition; wherein the total weight of the water-based printing ink composition is 100 parts by weight;

wherein the aqueous resin mixture includes a first aqueous resin and a second aqueous resin; wherein the first aqueous resin is an aqueous polycarbonate modified polyurethane resin, and the second aqueous resin is an aqueous polyester modified polyurethane resin;

wherein the first aqueous resin has a first glass transition temperature, the second aqueous resin has a second glass transition temperature, the first glass transition temperature is greater than the second glass transition temperature, and an absolute value of a difference between the first glass transition temperature and the second glass transition temperature is not less than 40° C.; wherein the first glass transition temperature is not less than 100° C., and the second glass transition temperature is not greater than 60° C., and wherein the quick-drying agent is at least one material selected from the group consisting of an alcohol and a ketone, and the quick-drying agent has a boiling point of not greater than 85° C..

14. The method for producing the water-based printing ink composition suitable for gravure printing according to claim 1, wherein the water-based printing ink composition has a minimum film-forming temperature (MFFT) between 30° C. and 60° C., and has a film-forming thickness between 1 μm and 10 μm; wherein after the water-based printing ink composition is printed, greater than 95% of the water content of the printing ink composition is removed under a drying temperature between 45° C. and 55° C. and a drying time of not greater than 60 seconds so that a coating film is formed; wherein, in the coating film, a content of the quick-drying agent is not greater than 20 parts per million by weight (ppm).

* * * * *